(12) United States Patent
Caritu (10) Patent No.: US 9,151,777 B2
(45) Date of Patent: Oct. 6, 2015

(54) DEVICE FOR DETECTING A PERCUSSION EVENT, AND ASSOCIATED MOBILE SYSTEM

(75) Inventor: Yanis Caritu, Saint Joseph la Riviere (FR)

(73) Assignee: MOVEA, Grenoble (FR)

( * ) Notice: Subject to any disclaimer, the term of this patent is extended or adjusted under 35 U.S.C. 154(b) by 602 days.

(21) Appl. No.: 12/990,624

(22) PCT Filed: Jul. 31, 2008

(86) PCT No.: PCT/EP2008/060102
§ 371 (c)(1),
(2), (4) Date: May 3, 2011

(87) PCT Pub. No.: WO2009/132712
PCT Pub. Date: Nov. 5, 2009

(65) Prior Publication Data
US 2011/0046914 A1 Feb. 24, 2011

Related U.S. Application Data

(60) Provisional application No. 61/049,100, filed on Apr. 30, 2008.

(51) Int. Cl.
*G01P 15/00* (2006.01)
*G01P 15/18* (2013.01)
(Continued)

(52) U.S. Cl.
CPC ............. *G01P 15/18* (2013.01); *G01P 15/0891* (2013.01); *G06F 1/163* (2013.01);
(Continued)

(58) Field of Classification Search
CPC . G01P 15/0891; G06F 1/1616; G06F 1/1684; G06F 1/163; H04M 2250/12; H04M 1/7253
USPC ................. 702/141; 73/510, 514.01; 345/158
See application file for complete search history.

(56) References Cited

U.S. PATENT DOCUMENTS

| 5,982,573 | A  | * | 11/1999 | Henze .............................. 360/75 |
| 6,369,794 | B1 |   | 4/2002  | Sakurai et al. |
| 7,457,719 | B1 | * | 11/2008 | Kahn et al. .................... 702/141 |
| 2002/0174588 | A1 | * | 11/2002 | Danner et al. ................ 42/70.09 |
| 2003/0158699 | A1 | * | 8/2003 | Townsend et al. ............. 702/151 |
| 2006/0184336 | A1 | * | 8/2006 | Kolen ........................... 702/150 |

(Continued)

FOREIGN PATENT DOCUMENTS

| EP | 0 802 415 | 10/1997 |
| EP | 1 715 349 | 10/2006 |

OTHER PUBLICATIONS

Dai, Rongching, "Application of Tilt Sensors in Functional Electrical Stimulation", Jun. 1996, IEEE Transaction on Rehabilitation Engineering, vol. 4 No. 2, p. 63-72.*
International Search Report dated Jan. 29, 2009 in PCT/EP2008/060102.

*Primary Examiner* — Janet Suglo
*Assistant Examiner* — Stephanie Bloss
(74) *Attorney, Agent, or Firm* — Stroock & Stroock & Lavan LLP (57) ABSTRACT

The device for detecting percussion events (DISP) comprises at least one axial accelerometer sensor (ACC1, ACC2, ACC3), characterized in that it also comprises at least one additional axial sensor insensitive to the translational vibrations (MAGN1, MAGN2), for measuring an information item representative of the orientation of the device (DISP) relative to a vector field of known direction within a fixed coordinate system not linked to the device (DISP), and low cut-off filtering means (FILTCB) provided with at least one input receiving measurements transmitted by the axial sensor or sensors (ACC1, ACC2, ACC3, MAGN1, MAGN2), means (AN) of analyzing the measurements filtered by said low cut-off filtering means (FILTCB), comprising comparison means (COMP) for comparing data from the analysis means (AN) with one or two thresholds (SP, SN).

16 Claims, 12 Drawing Sheets (51) Int. Cl.
*G01P 15/08* (2006.01)
*G06F 1/16* (2006.01)
*G06F 3/01* (2006.01)
*H04M 1/725* (2006.01)

(52) U.S. Cl.
CPC ........... *G06F 1/1616* (2013.01); *G06F 1/1626* (2013.01); *G06F 1/1684* (2013.01); *G06F 3/017* (2013.01); *G06F 2200/1636* (2013.01); *H04M 1/7253* (2013.01); *H04M 2250/12* (2013.01)

(56) References Cited

U.S. PATENT DOCUMENTS

| | | |
|---|---|---|
| 2006/0213267 A1 | 9/2006 | Tronconi et al. |
| 2007/0030587 A1* | 2/2007 | Noda et al. .................. 360/75 |
| 2007/0067128 A1* | 3/2007 | Vock et al. .................. 702/94 |
| 2007/0151772 A1* | 7/2007 | Wu ......................... 177/25.14 |
| 2007/0163343 A1* | 7/2007 | David ......................... 73/490 |
| 2009/0153342 A1* | 6/2009 | Thorn ......................... 340/669 |

* cited by examiner

DEVICE FOR DETECTING A PERCUSSION EVENT, AND ASSOCIATED MOBILE SYSTEM

The invention relates to a device for detecting percussion events comprising at least one axial accelerometer, and to an associated mobile system.

BACKGROUND OF THE INVENTION

There are impact detection devices. The document U.S. Pat. No. 6,369,794 B1 (Matsushita Electric Industrial Co) discloses a system for managing intentional impacts made by a user on a cell phone. The device comprises at least one accelerometer whose measurements are processed by comparison with thresholds to detect an impact.

Such systems have a not inconsiderable detection error rate, and significant calculation means.

One aim of the invention is to offer an alternative to the abovementioned devices, with reduced cost and complexity, and with a reduced percussion event detection error rate.

Another aim of the invention is to be able to distinguish a strong angular acceleration from a genuine percussion event.

SUMMARY OF THE INVENTION

According to one aspect of the invention, there is proposed a device for detecting percussion events comprising at least one axial accelerometer sensor, characterized in that it also comprises at least one additional axial sensor insensitive to the translational vibrations, for measuring an information item representative of the orientation of the device relative to a vector field of known direction within a fixed coordinate system not linked to the device, and low cut-off filtering means provided with at least one input receiving measurements transmitted by the axial sensor or sensors, means of analyzing the measurements filtered by said low cut-off filtering means, comprising comparison means for comparing data from the analysis means with one or two thresholds.

Thus, the abovementioned filtering allows only the high frequencies to pass, which are those of brief events, and therefore useful for the detection algorithm. Moreover, this preprocessing is applied only to a window of a size related to the anticipated event. The quality of detection of such events is thus enhanced.

Furthermore, such additional sensors may be, for example, magnetometers, gyrometers or photoelectric cells. The device is then capable of not confusing a rapid rotational acceleration with a percussion event.

In one embodiment, the device comprises two or three accelerometers mounted in pairs orthogonally.

It is then almost impossible not to detect a percussion event, because the detection is made on two or three axes in space.

According to one embodiment, the device comprises two additional axial sensors mounted orthogonally.

The device can, regardless of the axis of a rapid acceleration, differentiate such a rapid acceleration and a percussion event. This is a configuration that is adequate for detecting any percussion event.

In one embodiment, said low cut-off filtering means comprise:
  first means of calculating a norm of a vector having, for its components, the simultaneous measurement(s) transmitted by the axial accelerometer(s);
  first means bis for calculating a norm of a vector bis having, for its components, the simultaneous measurement(s) transmitted by the additional axial sensor(s);
  second means of calculating, over a sliding window, a time average, over the duration of the current window, of the norm of said vector; and
  second means bis of calculating, over a sliding window, a time average, over the duration of the current window, of the norm of said vector bis.

Furthermore, said low cut-off filtering means comprise a subtractor designed to:
  subtract the time average, over the duration of the current window, of the norm of said vector, supplied by said second calculation means, from the norm of said vector, supplied by said first calculation means; and
  subtract the time average, over the duration of the current window, of the norm of said vector bis, supplied by said second calculation means bis, from the norm of said vector bis, supplied by said first calculation means bis.

A norm of a vector of the measurements from the accelerometer(s) is thus centered, as is a norm of a vector of the measurements from the additional sensor(s), should the latter be present.

In another embodiment, said low cut-off filtering means comprise:
  first means of calculating a vector having, for respective components, a norm of the simultaneous measurement(s) transmitted by the axial accelerometer(s);
  first means bis of calculating a vector bis having, for its respective components, a norm of the simultaneous measurement(s) transmitted by the additional axial sensor(s);
  second means of calculating, over a sliding window, a time average, over the duration of the current window, of said vector; and
  second means bis of calculating, over a sliding window, a time average, over the duration of the current window, of said vector bis.

Furthermore, said low cut-off filtering means comprise a subtractor designed to:
  subtract the time average, over the duration of the current window, of said vector, supplied by said second calculation means from the vector supplied by said first calculation means; and
  subtract the time average, over the duration of the current window, of said vector bis, supplied by said second calculation means bis, from the vector bis supplied by said first calculation means bis.

The normed components of a vector of the measurements from the accelerometer(s) are thus centered, as are the normed components of a vector of the measurements from the additional sensor(s), should the latter be present.

According to one embodiment, said comparison means are designed to:
  compare the scalar difference or the components of the vector difference, corresponding to the accelerometer(s), delivered at the output of said low cut-off filtering means, with two thresholds of opposite signs, positive and negative; and
  compare the scalar differences or the components of the vector differences, corresponding to the additional axial sensor(s), delivered at the output of said low cut-off filtering means, with two thresholds of opposite signs, positive and negative.

Furthermore, said analysis means are designed to deliver an information item representative of the detection of a percussion event when said comparison means detect a positive overshoot of the positive threshold and a negative overshoot of the negative threshold, successively in any order, on the scalar difference or on at least one component of the vector difference corresponding to the accelerometer(s), delivered at the output of said low cut-off filtering means, and, when, furthermore, simultaneously, said comparison means do not detect any positive overshoot of the positive threshold or negative overshoot of the negative threshold of a component of the vector difference corresponding to the additional axial sensor(s), delivered at the output of said low cut-off filtering means.

The expression "negative overshoot of a negative threshold" should be understood to mean that a value below the negative threshold has been reached.

The device makes it possible to provide an information item representative of the detection of a percussion event, based on an abovementioned centering, with enhanced accuracy.

According to another embodiment, said analysis means comprise:

third means of calculating the square of the scalar difference or the squares of the components of the vector difference, corresponding to the accelerometer(s), delivered at the output of said low cut-off filtering means; and third means bis of calculating the square of the scalar difference or the squares of the components of the vector difference, corresponding to the additional axial sensor(s), delivered at the output of said low cut-off filtering means.

Furthermore, said analysis means are designed to deliver an information item representative of the detection of a percussion event, when said comparison means detect a positive overshoot of a positive threshold, on the square of the scalar difference or on the square of at least one component of the vector difference corresponding to the accelerometer(s), delivered at the output of said low cut-off filtering means, and when, furthermore, simultaneously said comparison means do not detect any positive overshoot of the positive threshold of the square of the scalar difference or of the square of the component of the vector difference corresponding to the additional axial sensor(s), delivered at the output of said low cut-off filtering means.

The device makes it possible to provide an information item representative of the detection of a percussion event, based on an abovementioned centering, with limited calculation means.

The size of the sliding window may lie between approximately one millisecond and three hundred milliseconds.

Such a sliding window size is an excellent trade-off between accuracy, calculation time and response latency.

For example, said additional axial sensors are magnetometers.

The magnetometers measure only the earth's magnetic field and are totally insensitive to mechanical forces, impacts, vibrations or shocks. In this role, they are more robust than a gyrometer for example, which, although sensitive to orientation, may have a slight sensitivity to impacts and vibrations.

For example, the norm is Euclidean, such as the norm 1, the norm 2 or the infinite norm. Obviously, any other norm is appropriate to the implementation of the invention.

There is also proposed, according to another aspect of the invention, a mobile system comprising a percussion event detection device as claimed in one of the preceding claims, said mobile system comprising a computer mouse, a remote control, or a video game peripheral device, or a cell phone, or a laptop computer, or a shoe, or a unit provided with body fixing means.

Thus, any mobile system may incorporate a percussion event detection device. Also in this respect, clothing or bags that are carried are also good candidates for accommodating such a function.

In one embodiment, said analysis means being designed to deliver an information item representative of the detection of a percussion event, the system comprises internal or external means for correlating a reception of one or more information items representative of the detection of a percussion event during a predetermined time interval with the triggering of an event, such as a computer click, double click or multiclick.

Thus, it is easy to associate a percussion event with a click, and a double percussion event with a double click. Obviously, a percussion element may be associated with any desired event.

Similarly, such a percussion event detection may be advantageous in a "motion-based metronome" type device, the idea of which is to control a rhythm: detecting the impacts makes it possible to count, for example, the number of footsteps on the ground per time unit, when such a device is embedded in a pair of shoes.

BRIEF DESCRIPTION OF DRAWINGS

The invention will be better understood after studying a few embodiments described as nonlimiting examples and illustrated by the appended drawings in which:

FIGS. 7a, 7b, 7c, 7d, 7e1, 7e2, 7f1, 7f2, and 7g diagrammatically illustrate various embodiments of a system according to one aspect of the invention;

DETAILED DESCRIPTION OF PREFERRED EMBODIMENT

In all the following figures, the elements that have the same references are similar.

Figure 1:
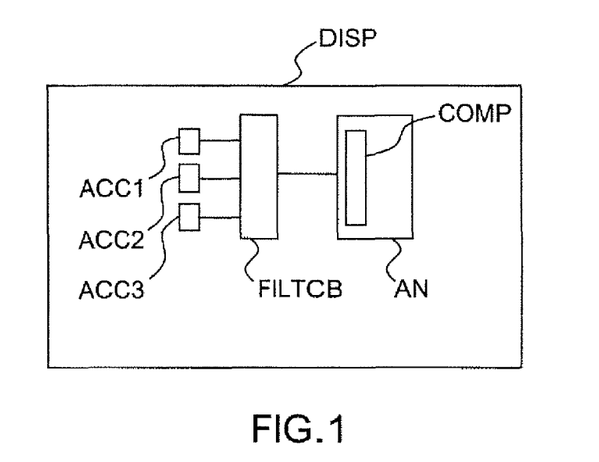
FIG. 1 diagrammatically illustrates one embodiment of a device comprising three accelerometers, according to one aspect of the invention.

As illustrated in FIG. 1, a percussion or impact event detection device DISP comprises three accelerometers ACC1, ACC2 and ACC3, mounted in pairs orthogonally. In a variant, the percussion event detection device DISP comprises at least one accelerometer. The device DISP also comprises a low cut-off filter FILTCB, or, in other words, a high-pass filter, and an analysis module AN. The measurements from the accelerometers ACC1, ACC2 and ACC3 are transmitted to the low cut-off filter FILTCB from which the output data are transmitted to the analysis module AN which includes a comparison module COMP.

For example, the low cut-off filter may be a Butterworth filter.

Figure 2:
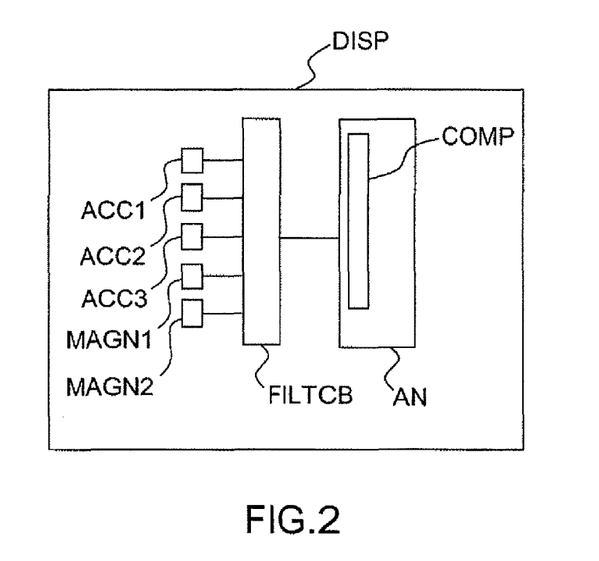
FIG. 2 diagrammatically illustrates another embodiment of a device comprising three accelerometers and two magnetometers, according to one aspect of the invention.

In FIG. 2, the percussion event detection device DISP also comprises two magnetometers MAGN1 and MAGN2 mounted orthogonally. In a variant, the device DISP may comprise between 1 and 3 accelerometers and a single magnetometer. More generally, the magnetometer(s) is/are additional axial sensors for measuring the orientation of the device relative to a vector field of known direction in a fixed coordinate system not linked to the device DISP that are insensitive to the vibrations such as, also, gyrometers or photoelectric cells.

Figure 3:
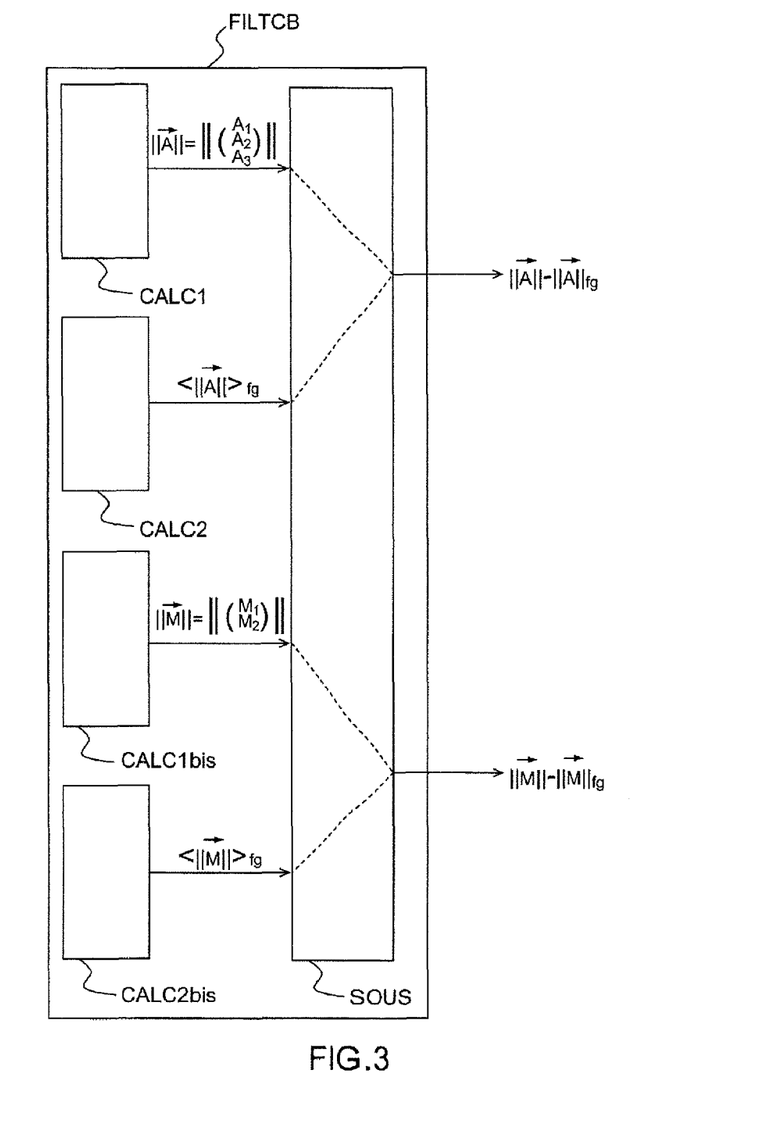
FIG. 3 diagrammatically illustrates one embodiment of a low cut-off filter, according to one aspect of the invention.

FIG. 3 represents an embodiment of the low cut-off filter FILTCB comprising a first calculation module CALC1 and a second calculation module CALC2. A first calculation module bis CALC1bis and a second calculation module bis CALC2bis, which are optional, are represented.

The first and second calculation modules bis CALC1bis and CALC2bis are present in embodiments in which the device DISP comprises at least one magnetometer, for example, as illustrated in FIG. 2.

The first calculation module CALC1 evaluates a norm $\|\vec{A}\|$ of a vector $\vec{A}$ having, for its components, the simultaneous measurement(s)

$$\vec{A} = \begin{pmatrix} A1 \\ A2 \\ A3 \end{pmatrix},$$

in this case three of them, transmitted by the axial accelerometers ACC1, ACC2 and ACC3.

In parallel, the second calculation module CALC2, evaluates, over a sliding window fg, a time average $<\|\vec{A}\|>_{fg}$, over the current window, of the norm $\|\vec{A}\|$ of the vector $\vec{A}$.

A subtractor SOUS is capable of calculating the difference $\|\vec{A}\|-<\vec{A}>_{fk}$ between the norm $\|\vec{A}\|$ of the vector $\vec{A}$, supplied by the first calculation means CALC1 and the time average $<\|\vec{A}\|>_{fg}$, over the current window, of the norm $\|\vec{A}\|$ of the vector $\vec{A}$.

In the present example, the device DISP comprising two magnetometers MAGN1 and MAGN2, the low cut-off filter FILTCB also comprises a first calculation module bis CALC1bis and a second calculation module bis CALC2bis, which would also be the case if the device DISP had only a single magnetometer. The first calculation module bis CALC1bis evaluates the norm M of a vector bis $\|\vec{M}\|$ having for its components the simultaneous measurement(s)

$$\vec{M} = \begin{pmatrix} M1 \\ M2 \end{pmatrix}$$

transmitted by the axial magnetometers MAGN1 and MAGN2.

In parallel, the second calculation module bis CALC2bis, evaluates, over a sliding window fg, a time average $<\|\vec{M}\|>_{fk}$, over the current window, of the norm $\|\vec{M}\|$ of the vector bis $\vec{M}$.

The subtractor SOUS is then capable of calculating the difference $\|\vec{M}\|-<\|\vec{M}\|>_{fg}$, between the norm $\|\vec{M}\|$ of the vector bis $\vec{M}$, supplied by the first calculation means bis CALC1bis, and the time average $<\|\vec{M}\|>_{fg}$, over the current window, of the norm $\|\vec{M}\|$ of the vector bis $\vec{M}$.

Advantageously, the calculations over a sliding window fg performed by the second calculation module or the second calculation module bis may add new incoming measurements, and remove an identical number of the oldest measurements from the sliding window fg, so as to limit the calculation time needed.

Figure 4:
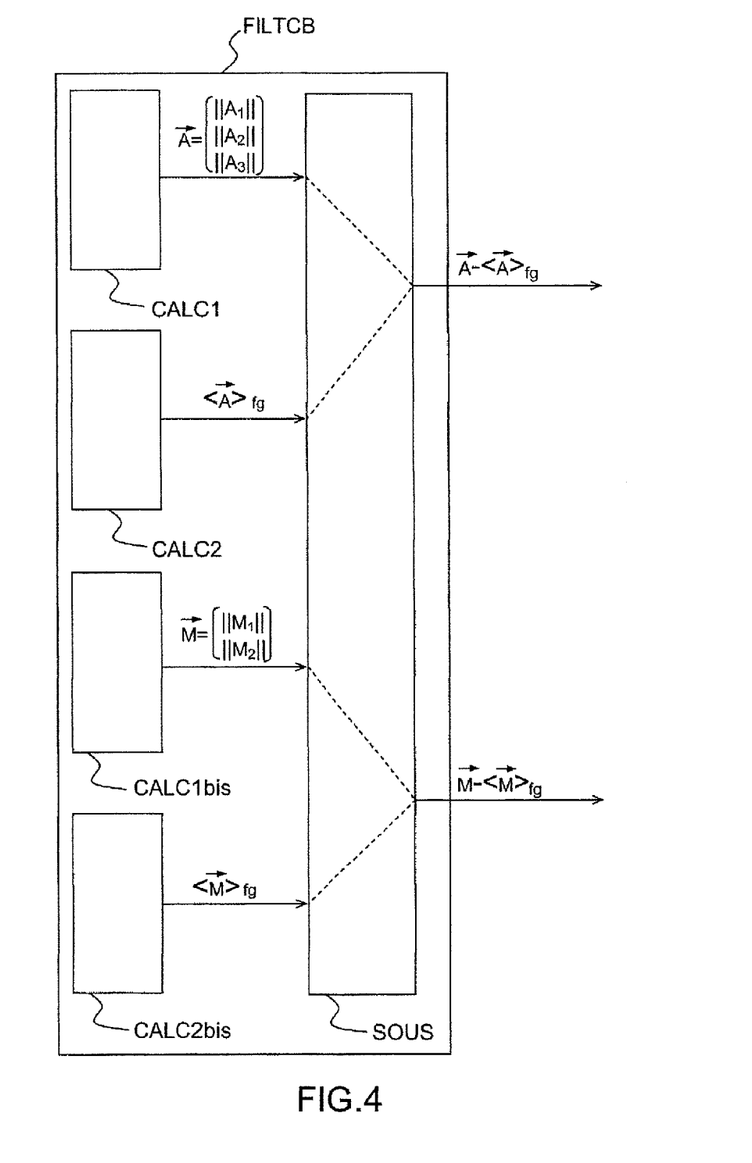
FIG. 4 diagrammatically illustrates another embodiment of a low cut-off filter, according to one aspect of the invention.

In a variant, in FIG. 4, the first calculation module CALC1 evaluates a vector $\vec{A}$ having, for its components, a norm of the simultaneous measurement(s)

$$\vec{A} = \begin{pmatrix} \|A1\| \\ \|A2\| \\ \|A3\| \end{pmatrix},$$

in this case three of them, transmitted by the axial accelerometers ACC1, ACC2 and ACC3.

In parallel, the second calculation module CALC2 evaluates, over a sliding window fg, a time average $<\vec{A}>_{fg}$, over the current window, of the vector $\vec{A}$.

The subtractor SOUS is capable of calculating the difference $\vec{A}-<\vec{A}>_{fg}$ between the vector $\vec{A}$, supplied by the first calculation means CALC1, and the time average $<\vec{A}>_{fg}$, over the current window, of the vector $\vec{A}$.

In the present example, the device DISP comprising two magnetometers MAGN1 and MAGN2, the low cut-off filter FILTCB also comprises a first calculation module bis CALC1bis and a second calculation module bis CALC2bis, which would also be the case if the device DISP had only a single magnetometer. The first calculation module bis CALC1bis evaluates a norm $\|\vec{M}\|$ of the vector bis $\vec{M}$ having for its components the simultaneous measurement(s)

$$\vec{M} = \begin{pmatrix} M1 \\ M2 \end{pmatrix},$$

in this case two of them, transmitted by the axial magnetometers MAGN1 and MAGN2.

In parallel, the second calculation module bis CALC2bis evaluates, over a sliding window fg, a time average $<\vec{M}>_{fg}$, over the current window, of the vector bis $\vec{M}$.

The subtractor SOUS is then capable of calculating the difference $\vec{M}-<\vec{M}>_{fg}$ between the norm $\|\vec{M}\|$ of the vector bis $\vec{M}$, supplied by the first calculation means bis CALC1bis and the time average $<\vec{M}>_{fg}$, over the current window, of the vector $\vec{M}$.

Figure 5:
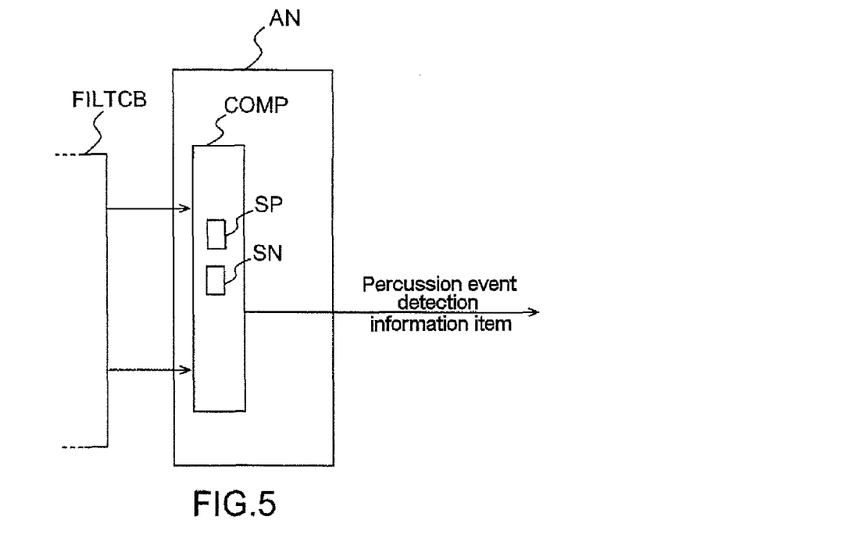
FIG. 5 diagrammatically illustrates one embodiment of an analysis module, according to one aspect of the invention.

FIG. 5 illustrates one embodiment of the percussion event detection device DISP in which the analysis module includes a comparison module COMP designed to compare the scalar difference or the components, in the present example three of them, of the vector difference, corresponding to the accelerometer(s), delivered at the output of the low cut-off filter FILTCB (cf FIG. 3 or FIG. 4), with two thresholds SP and SN of opposite signs, positive and negative.

In the example described, the device DISP comprising two magnetometers MAGN1 and MAGN2, the comparison module is also designed to compare the scalar differences or the components of the vector differences, corresponding to the additional axial sensor(s), in the present example two of them, delivered at the output of said low cut-off filtering means (see FIG. 3 or FIG. 4), with the two thresholds SP and SN of opposite signs, positive and negative.

The two thresholds SP and SN may be learned automatically during supervised phases or learning phases. For example, for time keeping with snapping of the fingers for a device comprising a unit provided with wrist fixing means, a time keeping movement phase without click, i.e. without impact, is performed for acquisition purposes. The same processing is applied, and the threshold is set at a percentage of the minimum or of the maximum of the centered signals, depending on the sensitivity or robustness required.

The analysis module AN delivers at its output an information item representative of the detection of a percussion event when the comparison module COMP detects a positive overshoot of the positive threshold SP and a negative overshoot of the negative threshold SN, successively in any order, on the scalar difference or on at least one component of the vector difference corresponding to the accelerometer(s), in this case three of them, delivered at the output of the low cut-off filter FILTCB, and, if there is at least one additional axial sensor present, in this case two magnetometers MAGN1 and MAGN2, when, in addition, simultaneously, the comparison module COMP does not detect any positive overshoot of the positive threshold SP or negative overshoot of the negative threshold SN of a component of the vector difference corresponding to the additional axial sensor(s), in this case the two magnetometers MAGN1 and MAGN2, delivered at the output of the low cut-off filter FILTCB.

If there is no additional magnetometer or sensor, only the first condition is considered.

Figure 6:
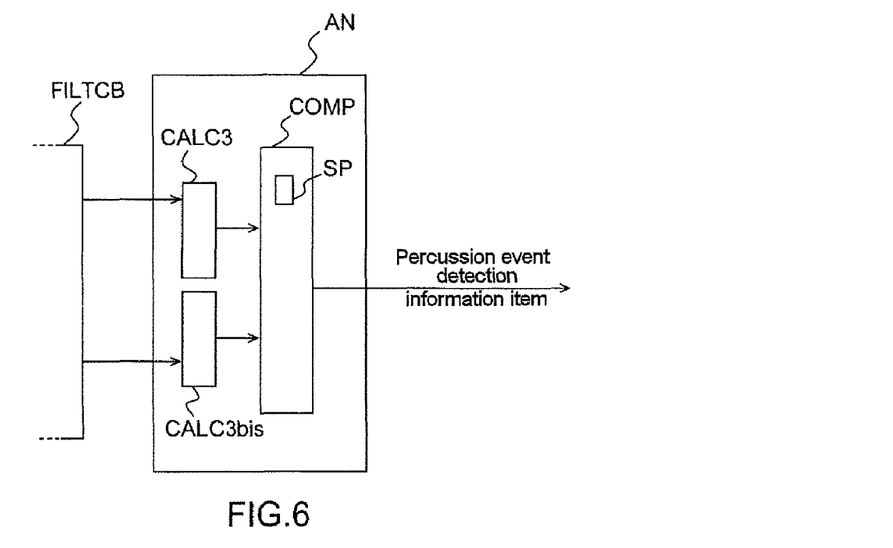
FIG. 6 diagrammatically illustrates another embodiment of an analysis module, according to one aspect of the invention.

FIG. 6, as a variant of FIG. 5, illustrates an embodiment of the percussion event detection device DISP in which the analysis module AN comprises third calculation means CALC3 for calculating the square of the scalar differences or squares of the components, in this case three of them, of the vector difference, corresponding to the accelerometer(s), delivered at the output of said low cut-off filtering means FILTCB (cf FIG. 3 or FIG. 4).

In the example described, the device DISP comprising two magnetometers MAGN1 and MAGN2, the analysis module AN comprises a third module bis CALC3 (CALC3bis) for calculating the square of the scalar difference or squares of the components of the vector difference, corresponding to the additional axial sensor(s), delivered at the output of said low cut-off filtering means FILTCB.

The analysis module AN delivers at its output an information item representative of the detection of a percussion event when the comparison module COMP detects a positive overshoot of a positive threshold SP, on the square of the scalar difference or on the square of at least one component of the vector difference corresponding to the accelerometer(s), in this case three of them, delivered at the output of the low cut-off filter FILTCB, and, if there is at least one additional axial sensor present, in this case two magnetometers MAGN1 and MAGN2, when, in addition, simultaneously, the comparison module does not detect any positive overshoot of the positive threshold of the square of the scalar difference or of the square of a component of the vector difference corresponding to the additional axial sensor(s), in this case the two magnetometers MAGN1 and MAGN2, delivered at the output of the low cut-off filter FILTCB.

If there is no additional magnetometer or sensor, only the first condition is considered.

The size of the sliding window is advantageously between approximately one millisecond and ten milliseconds, and the norm used may be any norm, for example the norm 1, the norm 2 or the infinite norm.

Figure 7A:
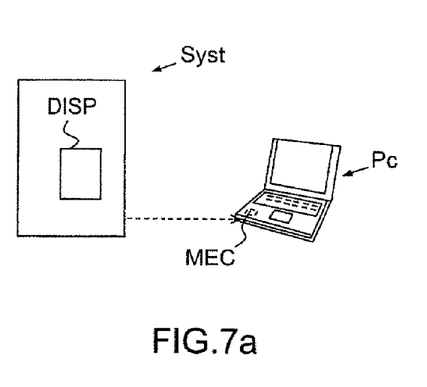

FIG. 7a illustrates a mobile system SYST according to one aspect of the invention, comprising a device DISP as described previously, and an external correlating module MEC, connected and internal to a computer, capable of correlating, on receipt of a percussion event detection information item, of triggering an event associated with the receipt of this information item, for example a click.

Figure 7B:
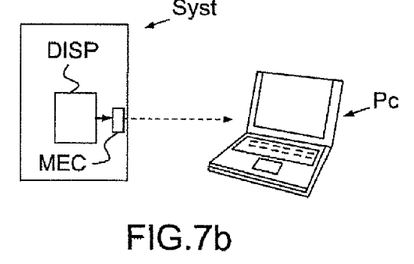

FIG. 7b is a variant of FIG. 7a, in which the correlating module MEC is internal to the mobile system.

Figure 7C:
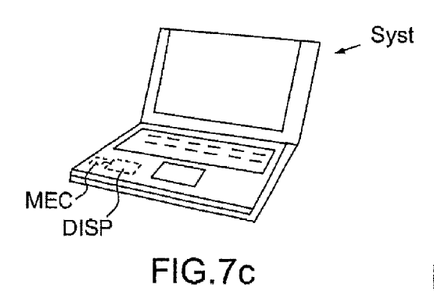
Figure 7D:
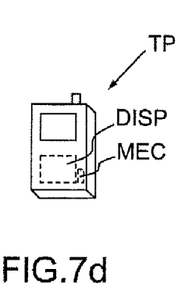

FIG. 7c, illustrates an embodiment of the mobile system SYST, in which the mobile system SYST is a laptop computer provided with a device DISP and a correlating module MEC which are incorporated, and FIG. 7d illustrates another embodiment, in which the mobile system SYST is a cell phone (TP) provided with a device DISP and a correlating module MEC that are integrated.

Figure 7E:
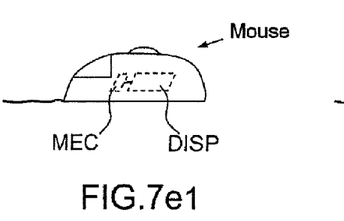
Figure 7E:
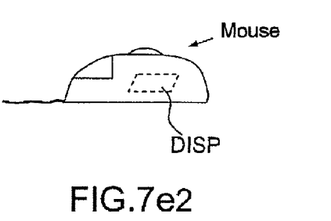

FIG. 7e1 illustrates an embodiment of the mobile system SYST in which the mobile system SYST is a computer mouse provided with a device DISP and a correlating module MEC that are incorporated, and FIG. 7e2 is a variant in which the correlating module MEC is remotely situated in the computer to which the mouse is connected, possibly being wired or wireless.

Figure 7F:
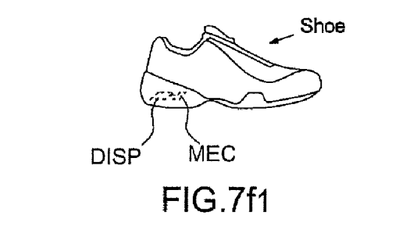
Figure 7F:
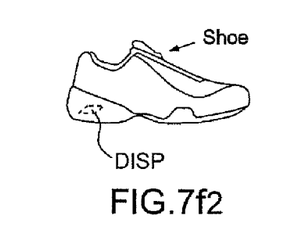

FIG. 7f1 illustrates an embodiment of the mobile system SYST in which the mobile system SYST is a shoe provided with a device DISP and a correlating module MEC that are incorporated, for example in the sole, and FIG. 7f2 is a variant in which the correlating module MEC is remotely situated in an external unit to which the mouse is connected, preferably by wireless link.

Figure 7G:
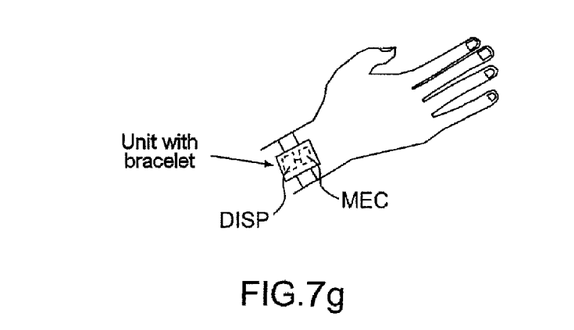

FIG. 7g diagrammatically represents a system SYST in the form of a unit with bracelet, comprising a device DISP and, possibly, a correlating module, the latter being able to be remotely situated in the receiving unit.

The receiving units mentioned may be, for example, a computer, a cell phone, a video game unit.

Obviously, in a variant, the mobile system SYST may also, for example, be a remote control, a 3D mouse, a bag or an item of clothing.

Figure 8A:
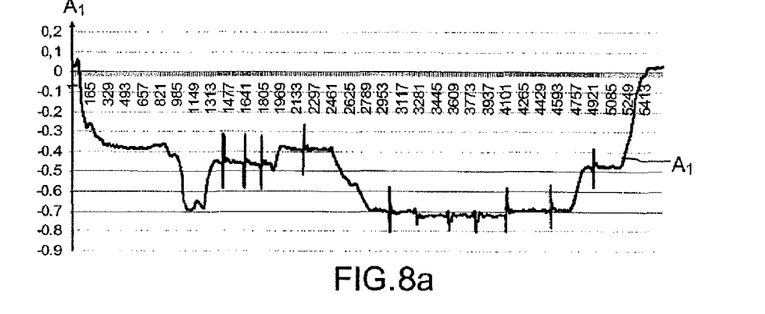
FIGS. 8a, 8b, 8c, 8d, and 8e illustrate the results obtained in an embodiment of a device comprising a single accelerometer.
Figure 8B:
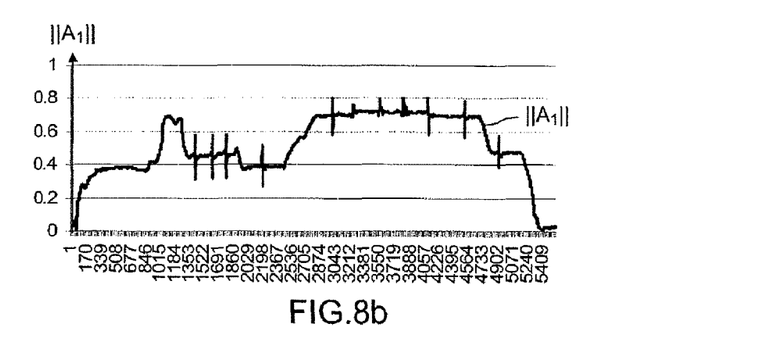
Figure 8C:
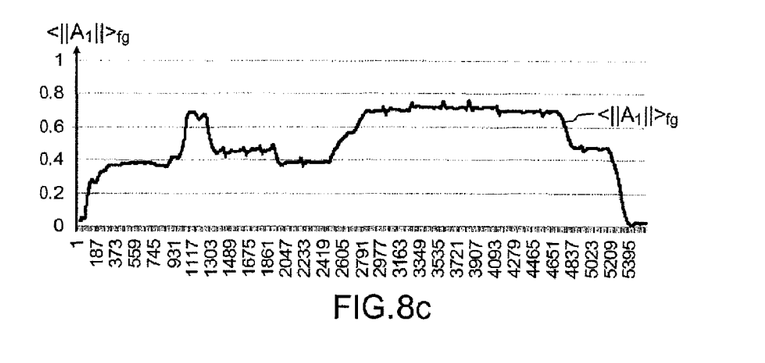
Figure 8D:
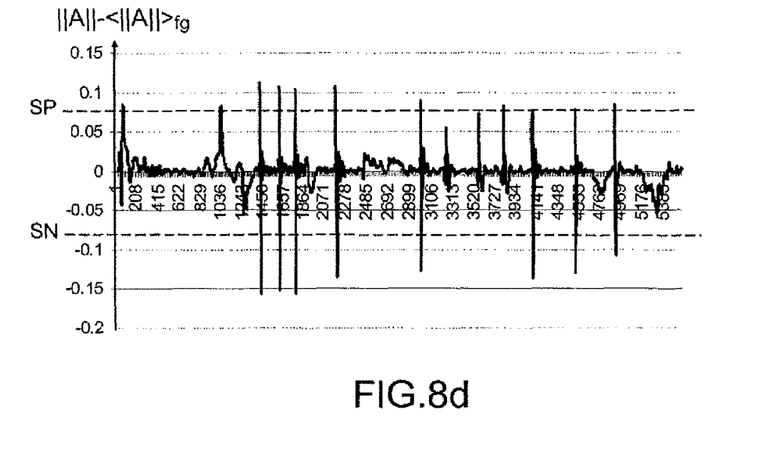

FIG. 8a illustrates an example of the device DISP comprising a single axial accelerometer, delivering the measurement A1, the norm of which is calculated, in FIG. 8b, and an average of the norm is calculated, in FIG. 8c, over a sliding window, in this example of 100 milliseconds. A centering of the norm is performed (FIG. 8d), or, in other words, the subtraction of the curve of the norm (FIG. 8b) and of the average (FIG. 8c), and compared to two thresholds, a positive threshold and a negative threshold, in order to detect the presence of percussion events.

Figure 8E:
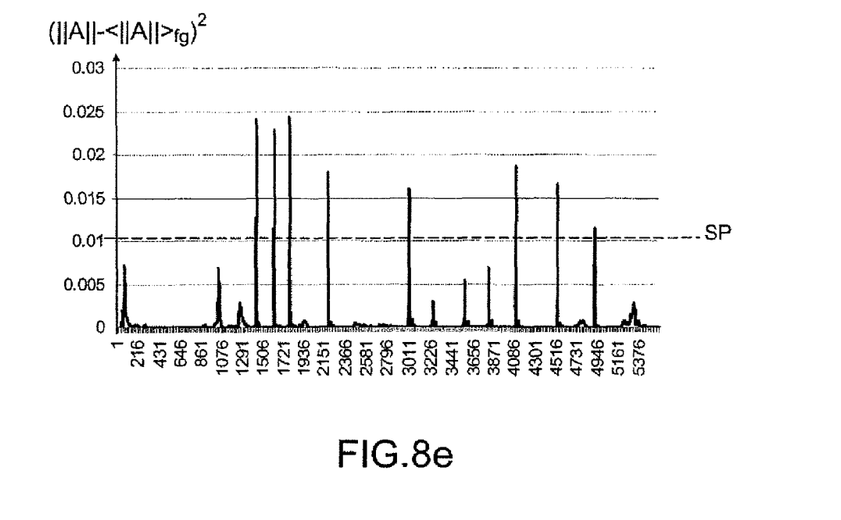
Figure 9A:
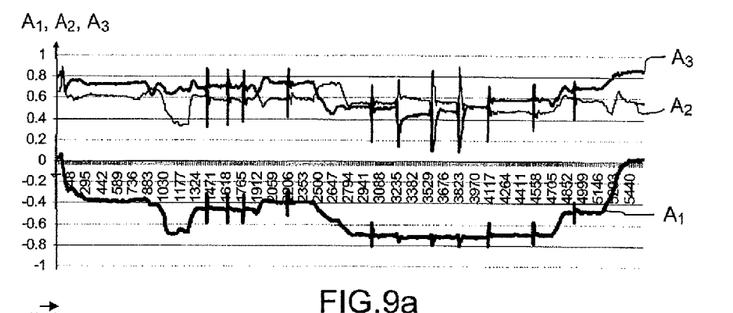
FIGS. 9a, 9b, 9c, 9d, and 9e illustrate the results obtained in an embodiment of a device comprising three accelerometers mounted in pairs orthogonally.
Figure 9B:
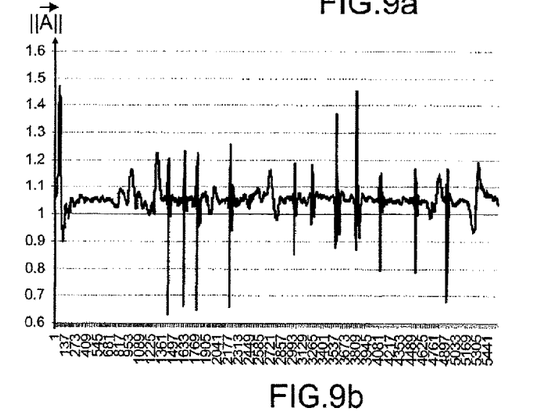
Figure 9C:
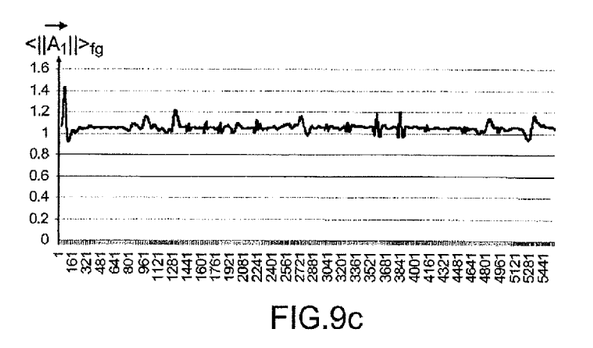
Figure 9D:
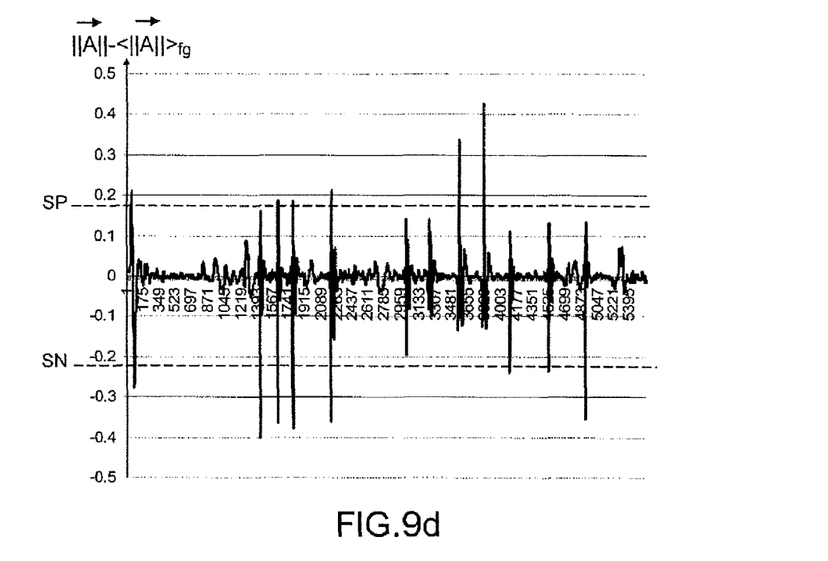
Figure 9E:
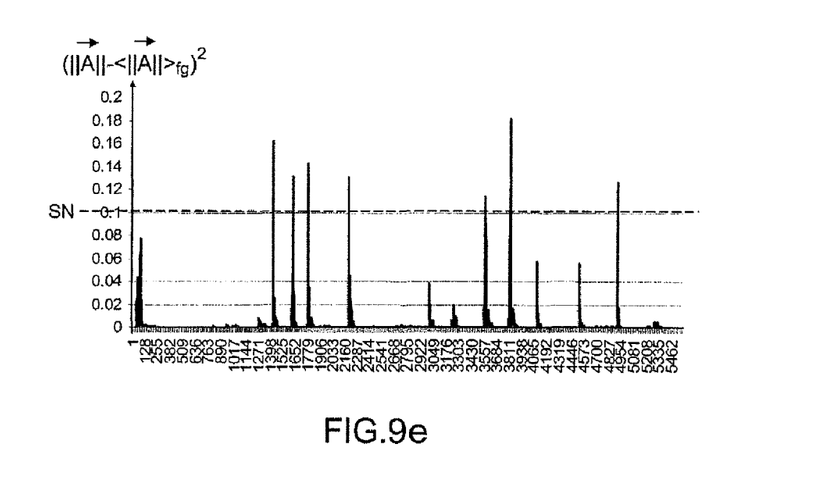

In a variant, in FIG. 8e, the square of the centered norm (FIG. 8d) is calculated and the result is compared with a positive threshold in order to detect the presence of percussion events.

FIGS. 9a, 9b, 9c, 9d and 9e represent a similar case for a device DISP provided with three accelerometers, supplying measurements A1, A2 and A3.

FIGS. 10a, 10b, 10c, 10d and 10e illustrate the addition of a magnetometer and the centering of the similar norm.

Figure 10A:
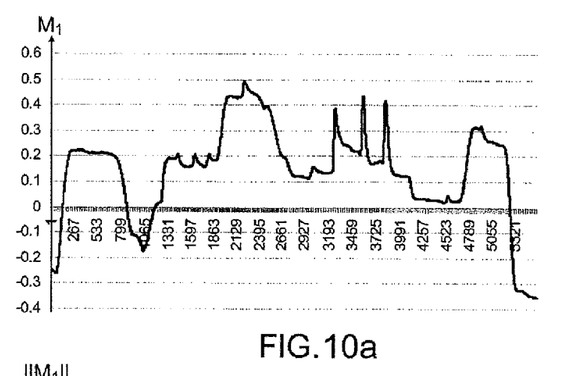
FIGS. 10a, 10b, 10c, 10d and 10e illustrate the results obtained in an embodiment of a device comprising at least one accelerometer and one magnetometer, according to one aspect of the invention.
Figure 10B:
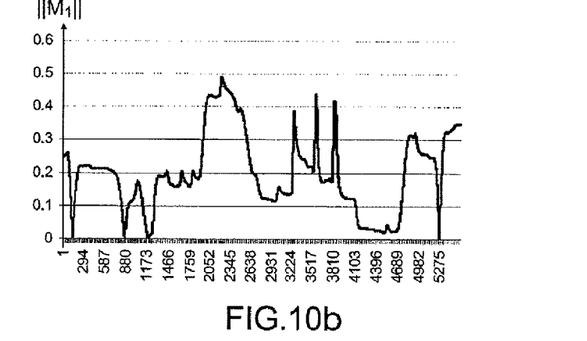
Figure 10C:
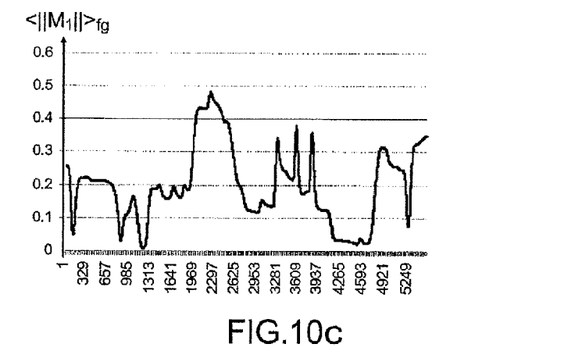
Figure 10D:
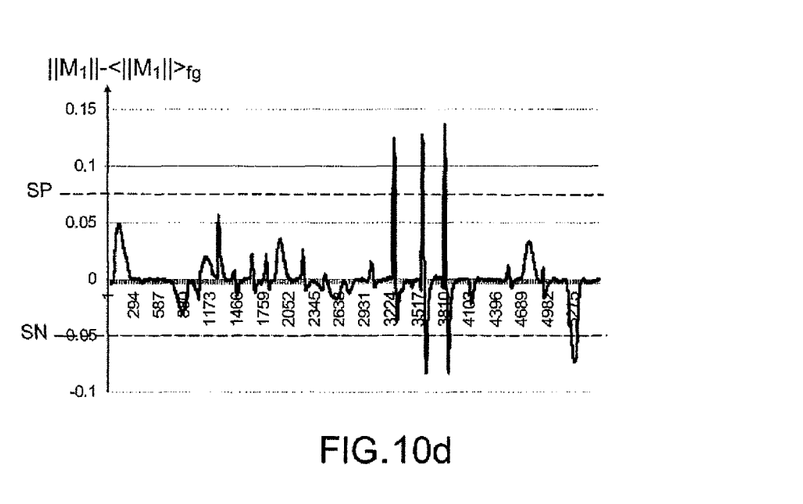

FIG. 10a illustrates an example of the device DISP comprising a single axial magnetometer, delivering the measurement M1, the norm of which is calculated, in FIG. 10b, and an average of the norm is calculated, in FIG. 10c, over a sliding window, in this example of 100 milliseconds. A centering of the norm is performed, or, in other words, the subtraction of the curve of the norm (FIG. 10b) and of the average (FIG. 10c), and compared to two thresholds, a positive threshold and a negative threshold, in order to detect the presence of percussion events.

Figure 10E:
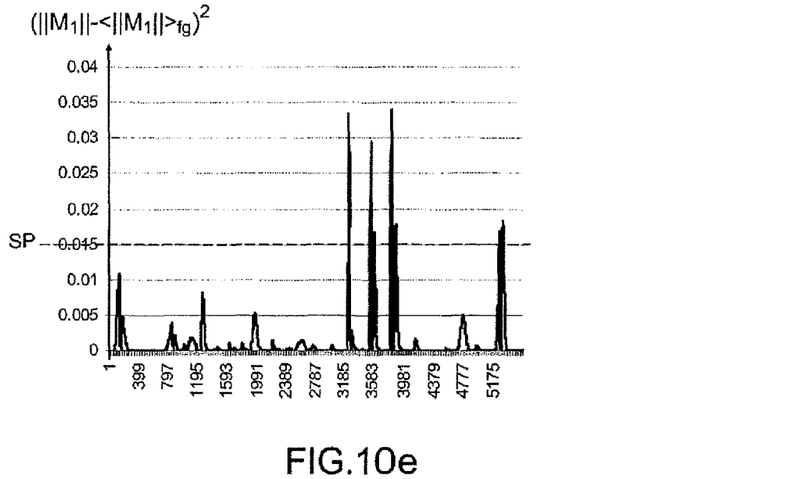

In a variant, in FIG. 10e, the square of the centered norm is calculated (FIG. 10d) and the result is compared with a positive threshold in order to detect the presence of percussion events.

The present invention makes it possible, at a reduced cost, to significantly enhance the detection of percussion events, and to associate another event such as a computer click with such a detection.

What is claimed is:

1. A device for detecting percussion events comprising:
   at least one axial accelerometer sensor,
   at least one axial magnetometer sensor insensitive to translational vibrations,
   low cut-off filtering means provided with at least one input receiving measurements transmitted by the at least one axial accelerometer sensor and the at least one magnetometer sensor, and
   analysis means for analyzing the accelerometer and magnetometer measurements filtered by said low cut-off filtering means, the analysis means comprising comparison means for comparing data from the filtered accelerometer measurements with at least one threshold, thereby determining a first outcome relating to the accelerometer measurements, and for comparing data from the filtered magnetometer measurements with at least one threshold, thereby determining a second outcome relating to the magnetometer measurements; and the analysis means further configured to detect a percussion event based on the first outcome and the second outcome so that a rotational acceleration not filtered by said low cut-off filtering means is not detected as a percussion event.

2. The device as claimed in claim 1, comprising two or three accelerometers mounted in pairs orthogonally.

3. The device as claimed in claim 2, wherein the at least one axial magnetometer comprises two axial magnetometers mounted orthogonally.

4. The device as claimed in claim 3, in which said low cut-off filtering means also comprise a subtractor designed to:
   subtract the time average, over the duration of the current window, of the norm of said vector, supplied by said second calculation means, from the norm of said vector, supplied by said first calculation means; and
   subtract the time average, over the duration of the current window, of the norm of said vector bis, supplied by said second calculation means bis, from the norm of said vector bis, supplied by said first calculation means bis.

5. The device as claimed in claim 4, in which said comparison means are designed to:
   compare the scalar difference or the components of the vector difference, corresponding to the at least one accelerometer, delivered at the output of said low cut-off filtering means, with two thresholds of opposite signs, positive and negative; and
   compare the scalar differences or the components of the vector differences, corresponding to the axial magnetometers, delivered at the output of said low cut-off filtering means, with two thresholds of opposite signs, positive and negative.

6. The device as claimed in claim 5, in which said analysis means are designed to deliver an information item representative of the detection of a percussion event when said comparison means detect a positive overshoot of the positive threshold and a negative overshoot of the negative threshold, successively in any order, on the scalar difference or on at least one component of the vector difference corresponding to the at least one accelerometer, delivered at the output of said low cut-off filtering means, and, when, furthermore, simultaneously, said comparison means do not detect any positive overshoot of the positive threshold or negative overshoot of the negative threshold of a component of the vector difference corresponding to the at least one axial magnetometer, delivered at the output of said low cut-off filtering means.

7. The device as claimed in claim 4, in which said analysis means comprise:
   third means of calculating the square of the scalar difference or the squares of the components of the vector difference, corresponding to the at least one accelerometer, delivered at the output of said low cut-off filtering means; and
   third means bis of calculating the square of the scalar difference or the squares of the components of the vector difference, corresponding to the axial magnetometers, delivered at the output of said low cut-off filtering means.

8. The device as claimed in claim 7, in which said analysis means are designed to deliver an information item representative of the detection of a percussion event, when said comparison means detect a positive overshoot of a positive threshold, on the square of the scalar difference or on the square of at least one component of the vector difference corresponding to the at least one accelerometer, delivered at the output of said low cut-off filtering means, and when, furthermore, simultaneously said comparison means do not detect any positive overshoot of the positive threshold of the square of the scalar difference or of the square of the component of the vector difference corresponding to the axial magnetometers, delivered at the output of said low cut-off filtering means.

9. The device as claimed in claim 1, in which said low cut-off filtering means comprise:
   first means of calculating a norm of a vector having, for its components, the simultaneous measurement(s) transmitted by the at least one axial accelerometer;
   first means bis for calculating a norm of a vector bis having, for its components, the simultaneous measurement(s) transmitted by the at least one axial magnetometer;
   second means of calculating, over a sliding window, a time average, over the duration of the current window, of the norm of said vector; and
   second means bis of calculating, over a sliding window, a time average, over the duration of the current window, of the norm of said vector bis.

10. The device as claimed in claim 9, in which the norm is Euclidean.

11. The device as claimed in claim 1, in which said low cut-off filtering means comprise:
   first means of calculating a vector having, for respective components, a norm of the simultaneous measurement(s) transmitted by the at least one axial accelerometer;
   first means bis of calculating a vector bis having, for its respective components, a norm of the simultaneous measurement(s) transmitted by the at least one axial magnetometer;

second means of calculating, over a sliding window, a time average, over the duration of the current window, of said vector; and second means bis of calculating, over a sliding window, a time average, over the duration of the current window, of said vector bis.

12. The device as claimed in claim 11, in which said low cut-off filtering means also comprise a subtractor designed to:

subtract the time average, over the duration of the current window, of said vector, supplied by said second calculation means from the vector supplied by said first calculation means; and subtract the time average, over the duration of the current window, of said vector bis, supplied by said second calculation means bis, from the vector bis supplied by said first calculation means bis.

13. The device as claimed in claim 9 or claim 11, in which the size of the sliding window lies between approximately one millisecond and three hundred milliseconds.

14. A mobile system comprising a percussion event detection device as claimed in any one of claims 1-8 and 10, said mobile system comprising a device selected from the group consisting of a computer mouse, a remote control, a video game peripheral device, a cell phone, a laptop computer, a shoe, and a unit provided with body fixing means.

15. A mobile system as claimed in claim 14, in which, said analysis means being designed to deliver an information item representative of the detection of a percussion event, the system comprises internal or external means for correlating a reception of one or more information items representative of the detection of a percussion event during a predetermined time interval with the triggering of an event.

16. The mobile system as claimed in claim 15, wherein the event is selected from the group consisting of a computer click, double click, and multiclick.

* * * * *